US007487222B2

(12) United States Patent
Begun et al.

(10) Patent No.: US 7,487,222 B2
(45) Date of Patent: Feb. 3, 2009

(54) SYSTEM MANAGEMENT ARCHITECTURE FOR MULTI-NODE COMPUTER SYSTEM

(75) Inventors: Ralph M. Begun, Raleigh, NC (US);
Adam L. Soderlund, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/092,188

(22) Filed: Mar. 29, 2005

(65) Prior Publication Data

US 2006/0224685 A1  Oct. 5, 2006

(51) Int. Cl.
G06F 15/173 (2006.01)
(52) U.S. Cl. ...................................... 709/208
(58) Field of Classification Search ................. 709/223, 709/208, 230
See application file for complete search history.

(56) References Cited

U.S. PATENT DOCUMENTS

| | | | | |
|---|---|---|---|---|
| 5,838,913 A | * | 11/1998 | Lysejko et al. | 709/208 |
| 5,864,653 A | * | 1/1999 | Tavallaei et al. | 714/2 |
| 5,907,689 A | * | 5/1999 | Tavallaei et al. | 710/110 |
| 5,933,614 A | * | 8/1999 | Tavallaei et al. | 710/306 |
| 5,987,604 A | | 11/1999 | Edrich | 713/1 |
| 6,070,253 A | * | 5/2000 | Tavallaei et al. | 714/31 |
| 6,081,865 A | * | 6/2000 | Tavallaei et al. | 710/309 |
| 6,105,146 A | * | 8/2000 | Tavallaei et al. | 714/2 |
| 6,128,732 A | | 10/2000 | Chaiken | 713/2 |
| 6,178,550 B1 | | 1/2001 | Pearce | 717/9 |
| 6,453,278 B1 | | 9/2002 | Favor et al. | 703/27 |
| 6,510,521 B1 | | 1/2003 | Albrecht et al. | 713/193 |
| 6,532,510 B2 | | 3/2003 | Klein | 710/260 |
| 6,633,916 B2 | * | 10/2003 | Kauffman | 709/229 |
| 7,043,587 B2 | * | 5/2006 | Burke et al. | 710/302 |
| 2002/0169951 A1 | | 11/2002 | Zimmer | 713/100 |
| 2003/0065914 A1 | | 4/2003 | Saw-Chu et al. | 713/1 |
| 2003/0093579 A1 | | 5/2003 | Zimmer et al. | 709/318 |
| 2003/0229794 A1 | | 12/2003 | Sutton, II et al. | 713/189 |
| 2004/0034816 A1 | | 2/2004 | Richard | 714/39 |
| 2004/0044888 A1 | | 3/2004 | Nalawadi et al. | 713/2 |

* cited by examiner

*Primary Examiner*—David Y Eng
(74) *Attorney, Agent, or Firm*—H. Artoush Ohanian; Cynthia S. Byrd; Biggers & Ohanian, LLP

(57) ABSTRACT

In a multi-node SMP system, at least one processor per node is enabled to execute the SMM task for the hardware resources that are local to that node. Additionally, each node is allocated its own local SMM code copy in its own SMM memory segment, to allow for improved access and a further reduction in internode traffic. In a preferred embodiment, only a signle processor per node is enabled to execute the SMM tasks, and specific SMM memory locations within the SMM memory segments are allocated and used to report status and results from each node. A root node SMM processor monitors the SMM status entries of the other nodes for completion. To further reduce run-time internode traffic, a per-node resource map is created to identify memory and I/O resources that are specific to a particular node. This per-node resource map is then stored locally within the SMM space on each node, respectively.

18 Claims, 9 Drawing Sheets

SYSTEM MANAGEMENT ARCHITECTURE FOR MULTI-NODE COMPUTER SYSTEM

BACKGROUND OF THE INVENTION

1. Field of the Invention

This invention relates to the field of system management in multi-node environments.

2. Description of the Related Art

System Management mode (SMM) is a special mode used in Intel compatible computer systems in which a special memory segment is used to store information and execute instructions without the "knowledge" of the operating system, i.e., in the background. This mode is typically used to handle hardware specific functions, and is used today in a high-end server systems for management of reliability related functions such as memory scrubbing and error handling. A primary function of SMM is the checking/monitoring of the memory and I/O subsystems within the computer.

SMM offers great flexibility for computer designers; however, it can also cause unintended problems if the execution time of this management code takes too much time away from the operating system. This problem arises in symmetric multiprocessing (SMP) machines and can become particularly severe in large multi-chassis or multi-node computers (the terms "node" and "chassis" are used interchangeably herein).

SMP is a computer architecture that provides fast performance by making multiple CPUs available to complete individual processes simultaneously. Unlike asymmetrical processing, any idle processor can be assigned any task, and additional CPUs can be added to improve performance and handle increased loads. A typical SMP configuration utilizes four CPUs and is referred to as a "four-way SMP system". In prior art four-way SMP systems, the SMM is configured so that one of the four CPUs accesses the SMM memory segment and controls and manages the SMM processes for the entire chassis. This is referred to as "Scheme 1 SMM" herein.

Recognizing that the timely checking of memory and I/O subsystems is highly desirable, an improvement was developed whereby all four CPUs can be utilized simultaneously (i.e., in parallel), thereby minimizing the delay. In this configuration, the SMM memory segment is partitioned so that each CPU can be allocated its task from the SMM code to perform an expeditious check on the memory and I/O subsystems. This is referred to herein as "Scheme 2 SMM".

A multi-chassis or multi-node SMP computer is configured by the interconnection of multiple computer chassis or nodes in a manner such that they act in concert as a single computer entity. The nodes of a multi-node computer system can be typically assembled from four-way SMP machines. Particularly in the case where the multiple nodes are interconnected to comprise large SMP machines, such as eight-way or 16-way SMP machines, the SMM processes and control and management thereof present significant delay and/or performance issues. Specifically, if Scheme 1 SMM processing is utilized, the size of memory and I/O subsystems to be checked using SMM multiplies, essentially increases 100% for each additional node. For example, in a two node computer system the single CPU assigned the task of performing the checking/managing operations must do so, not only for the memory and I/O subsystems within its own node, but also for the memory and I/O subsystems in the second node. Obviously, the more nodes there are in the multi-node computer system, the greater the number (or size) memory and I/O subsystems that will need to be checked by the single CPU assigned this task.

If Scheme 2 SMM processing is utilized, while it is true that all of the memory and I/O subsystems will be checked more quickly than in Scheme 1, it does not take advantage of the node architecture, since every CPU's task will be stored in and execute from the same base SMM resource space, hence creating inefficiencies in interconnection traffic, control and reporting, and root node SMM memory space utilization.

Accordingly, it would be desirable to have a way to efficiently utilize SMM processing in a multi-node system.

SUMMARY OF THE INVENTION

In a multi-node SMP system, one processor per node is enabled to execute the SMM task for the hardware resources that are local to that node. Additionally, each node is allocated its own local SMM code copy in its own SMM memory segment, to allow for improved access and a further reduction in internode traffic. In a preferred embodiment, specific SMM memory locations within the SMM memory segments are allocated and used to report status and results from each node. A root node SMM processor monitors the SMM status entries of the other nodes for completion. To further reduce run-time internode traffic, a per-node resource map is created to identify memory and I/O resources that are specific to a particular node. This per-node resource map is then stored locally within the SMM space on each node, respectively.

DETAILED DESCRIPTION OF THE PREFERRED EMBODIMENTS

Figure 1A:
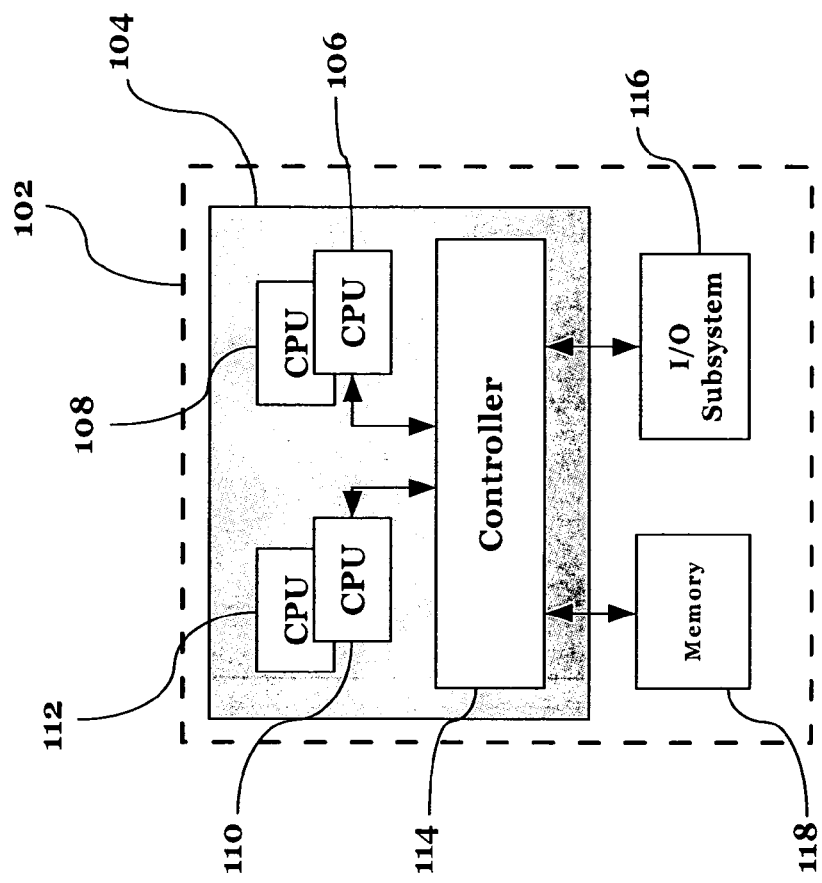
FIG. 1A illustrates a single node SMP system.

FIG. 1A illustrates a single node SMP system 102. The node 102 illustrated in FIG. 1A is a standard single node (sometimes also referred to as a single chassis) four-way configuration. The architecture illustrated in FIG. 1A is one example of an industry standard SMP system.

Figure 1B:
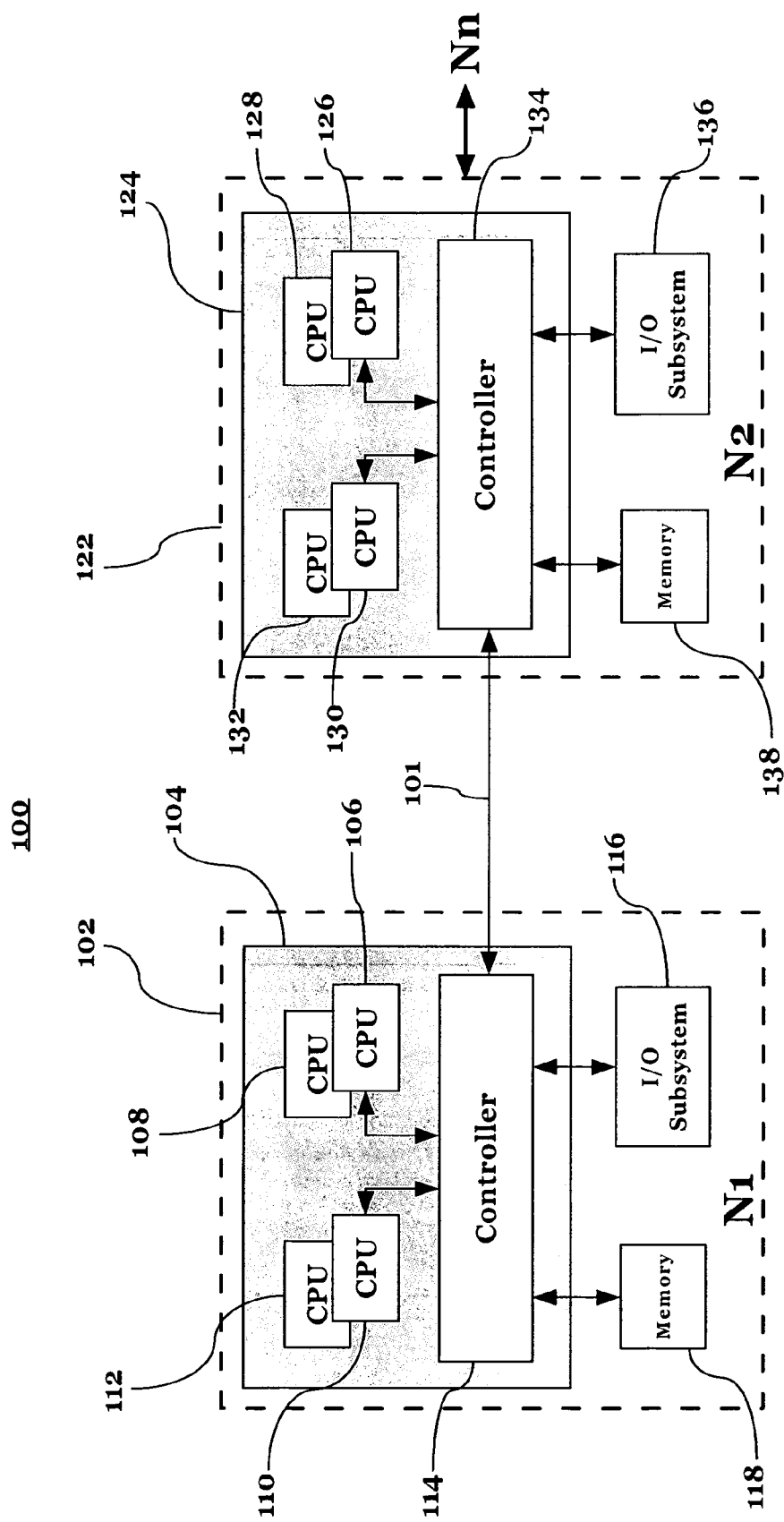
FIG. 1B shows a multi-node configuration in which two four-way systems are interconnected with a high speed interface 101 (e.g., via scalability ports), allowing scalability.

In node 102 of FIG. 1A, CPUs 106, 108, 110, and 112, as well as controller 114, reside on CPU card 104. Controller 114 controls the various operations between the CPUs and an I/O subsystem 116 and memory element 118. As noted above, the node 102 shown in FIG. 1A is a four-way configuration, since it has four CPUs within the node. Each CPU has equal access to all system resources (memory and I/O subsystem). This well known architecture has essentially four times the processing power of a single CPU configuration. FIG. 1B shows a multi-node configuration in which two four-way systems are interconnected with a high speed interface 101 (e.g., via scalability ports), allowing scalability. Scalability ports provide extensive expansion capabilities. These ports allow high speed communication between processors located in different chassis. The ports act like hardware extensions to the CPU local busses. They direct read and write cycles to the appropriate memory or I/O resources, as well as maintain cache and memory coherency between the processors and all memory. Although only two nodes are shown in FIG. 1B, it is understood that more than two nodes can be interconnected to thereby increase and expand the capabilities of the collective system. The multi-node systems configured as shown in FIG. 1B operate as a single unit and each processor has equal access to all system resources in all of the nodes.

In this example, the processing power of the single node four-way configuration of FIG. 1A is approximately doubled. In a well known manner, scalability ports on the controllers 114 and 134 enable interconnection of the two four-way systems. As can be seen in FIG. 1B, node 102 (also referred to herein as node 1) and node 122 (also referred to herein as node 2) are identical systems. It is understood that the nodes need not be identical; they can have different size memory elements and/or different amounts of I/O. Further, in typical configurations, there are between one and four CPUs in each, or there can be three in one, four in another, etc.

Figure 2A:
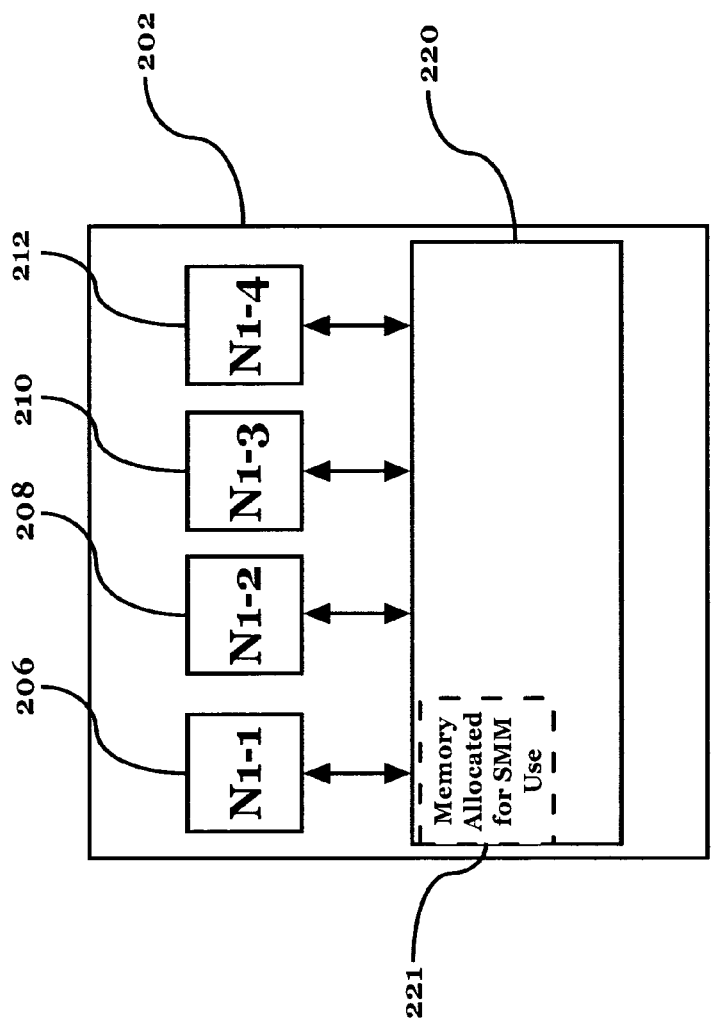
FIG. 2A is a block diagram illustrating the memory allocation for SMM processing when performed in accordance with Scheme 1 SMM.

FIG. 2A is a block diagram illustrating the memory allocation for SMM processing when performed in accordance with Scheme 1 SMM as described above. For simplicity of explanation, the block diagram of FIG. 2A (as well as the block diagrams of FIGS. 2B, 3A, 3B, and 4) only show the memory allocation and do not include the other elements of the systems, such as the controller and the I/O subsystem.

Referring to FIG. 2A, a single node 202 includes CPUs 206, 208, 210, and 212. CPU 206 is labeled "N1-1" to signify that it is CPU number 1 in node 1; CPU 208 is labeled "N1-2", to signify that it is CPU number 2 in node 1, etc.

A memory element 220 provides system memory which can be allocated for use by the CPUs as needed. In accordance with Scheme 1 SMM, one of the CPUs, in this example, CPU 206, is allocated for performing the SMM processing for the complete memory and I/O of the entire system, and a portion 221 (the SMM memory segment) of memory element 220 is allocated for the SMM processing. Typically the SMM processing will be performed by the allocated processor CPU 206.

Figure 2B:
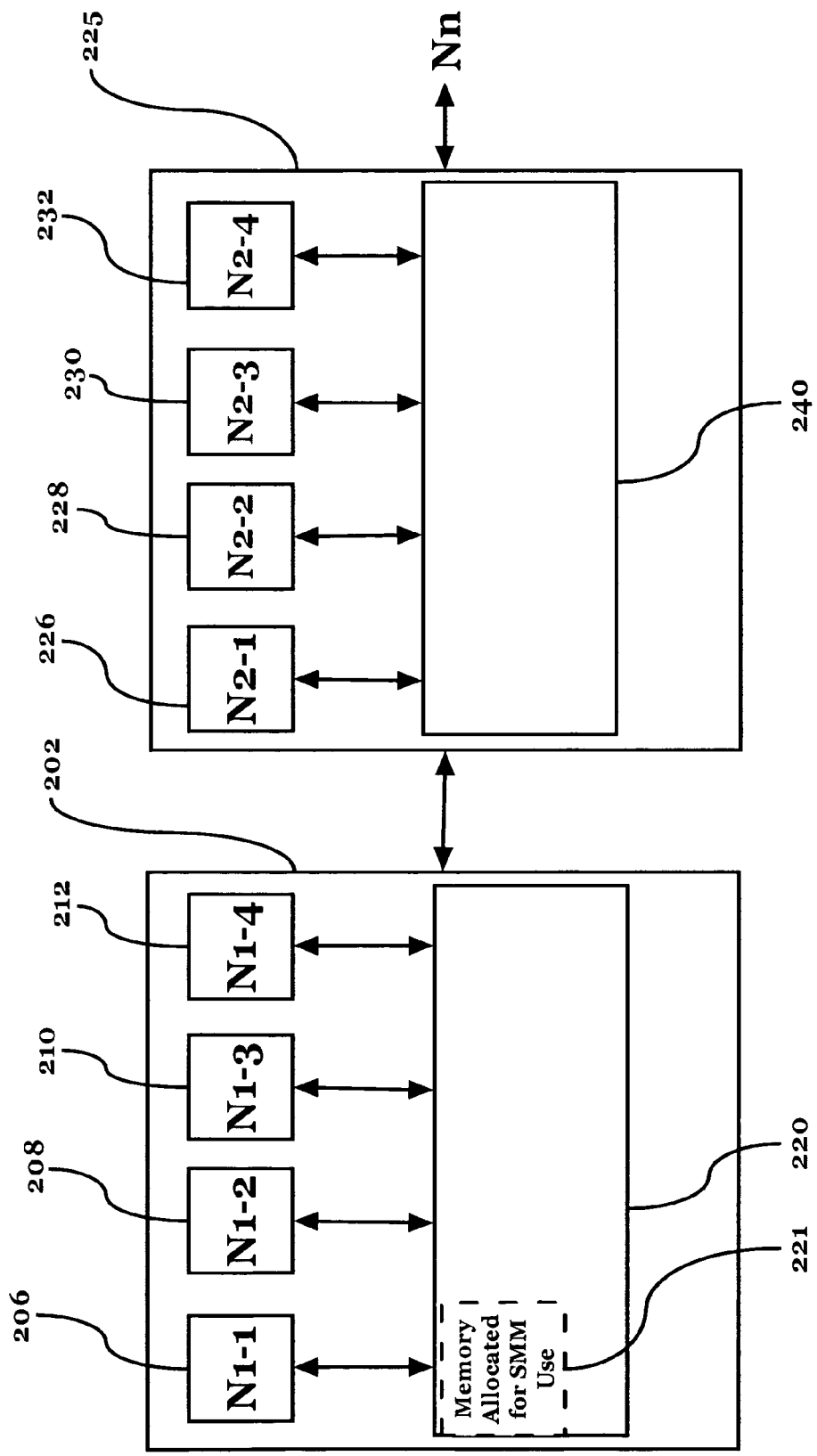
FIG. 2B illustrates Scheme 1 SMM in a multi-node configuration.

FIG. 2B illustrates Scheme 1 SMM in a multi-node configuration. Node 202 is identical to the single node illustrated in FIG. 2A. However, in this multi-node configuration, a second node 225 is coupled to first node 202 (for example, using scalability ports). Node 225 includes CPUs 226, 228, 230, and 232. CPU 226 is labeled "N2-1" to identify it as the first CPU in node 2; CPU 228 is labeled as "N2-2" to identify it as the second CPU in node 2, etc.

Node 225 includes a memory element 240. As can be seen, using Scheme 1 SMM, no memory segment of memory element 240 is allocated for SMM tasks; for the processing of SMM tasks, only the root node SMM memory segment 221 allocated to CPU 206 is utilized for these tasks.

As can be seen in FIG. 2B, under Scheme 1 SMM, in a multi-node environment, a single memory segment, memory segment 221 and a single CPU (CPU 206 in this example) are allocated for performing the SMM processing for the entire multi-node system, that is, for memory elements 220 and 240 and the I/O subsystems of each node (not shown in FIG. 2B).

Figure 3A:
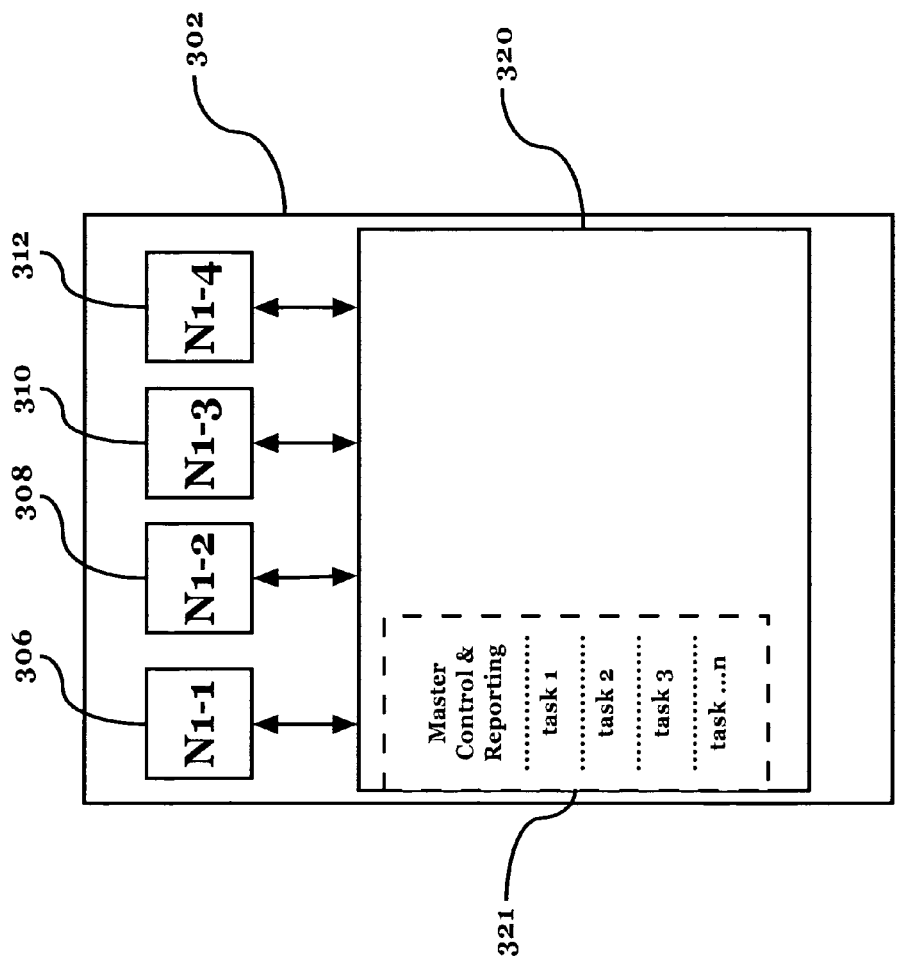
FIG. 3A illustrates the memory allocation for a four-way SMP system, this time with the memory allocated in accordance with Scheme 2 SMM processing.

FIG. 3A illustrates the memory allocation for a four-way SMP system, this time with the memory allocated in accordance with Scheme 2 SMM processing. As illustrated in FIG. 3A, the SMM memory segment 321 is partitioned to support tasking by each of the CPUs 306, 308, 310 and 312. In Scheme 2 SMM processing, each CPU utilizes its own resources to perform a portion of the SMM processing. Any of the tasks in the memory segment 321 can be executed by any of the CPUs 306, 308, 310, and 312. The "master control and reporting" code segmentis used by the primary CPU (typically CPU 306 in this example) for task control and overall results monitoring and reporting.

Figure 3B:
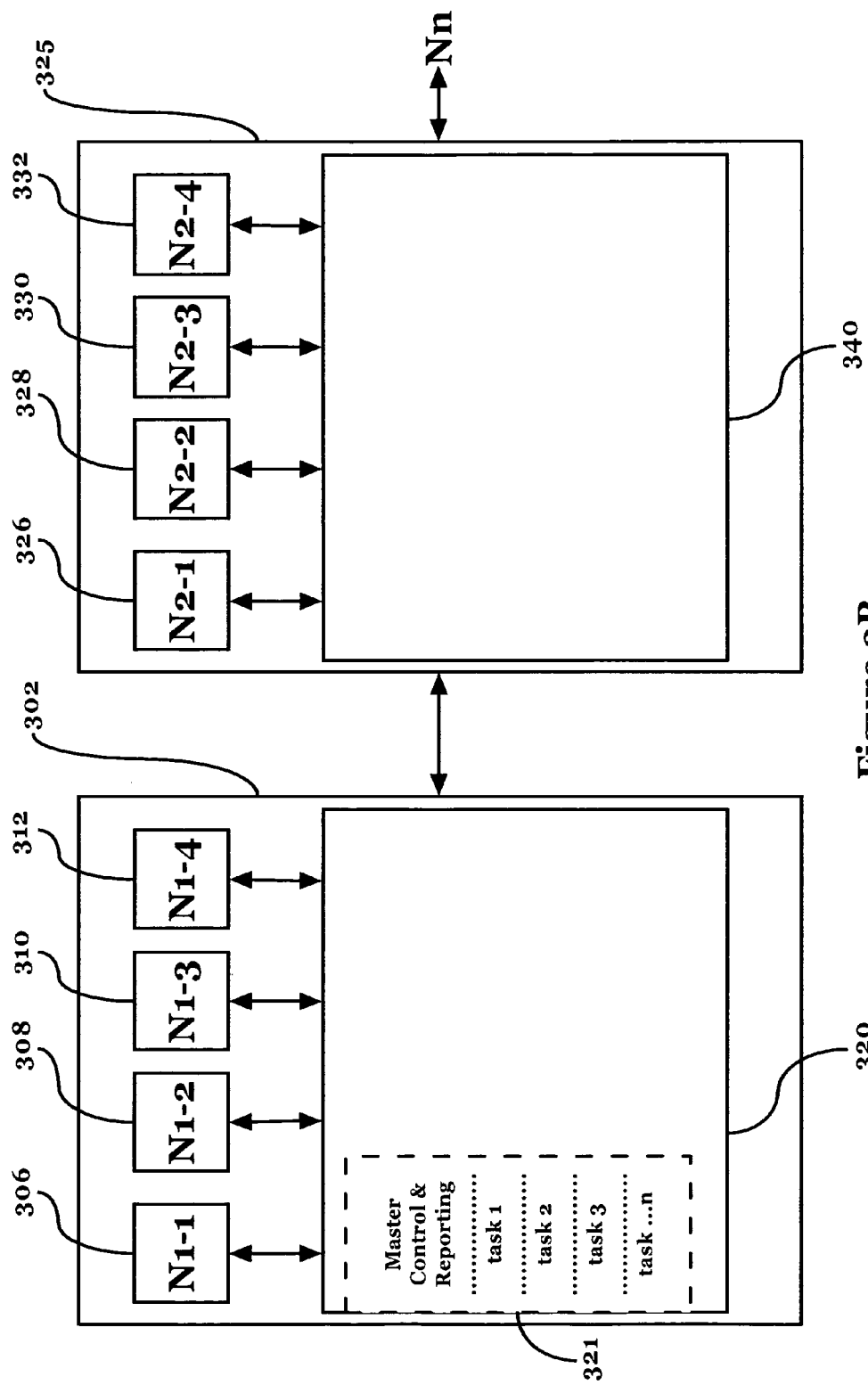
FIG. 3B illustrates multi-node SMM processing in accordance with Scheme 2 SMM processing

FIG. 3B illustrates multi-node SMM processing in accordance with Scheme 2 SMM processing. As can be seen in FIG. 3B, the relationship between the CPUs and the SMM memory segment is not changed in the multi-node configuration. Thus, in the second node, node 325, each of the CPUs 326, 328, 330, and 332 can execute any of the tasks in SMM memory segment 321 of memory element 320 in Node 1. As noted above, neither of the Scheme 1 or Scheme 2 SMM processing configurations makes efficient use of memory allocation in multi-node environments, so that the processors can be freed up quickly to perform their normal processing operations.

Figure 4:
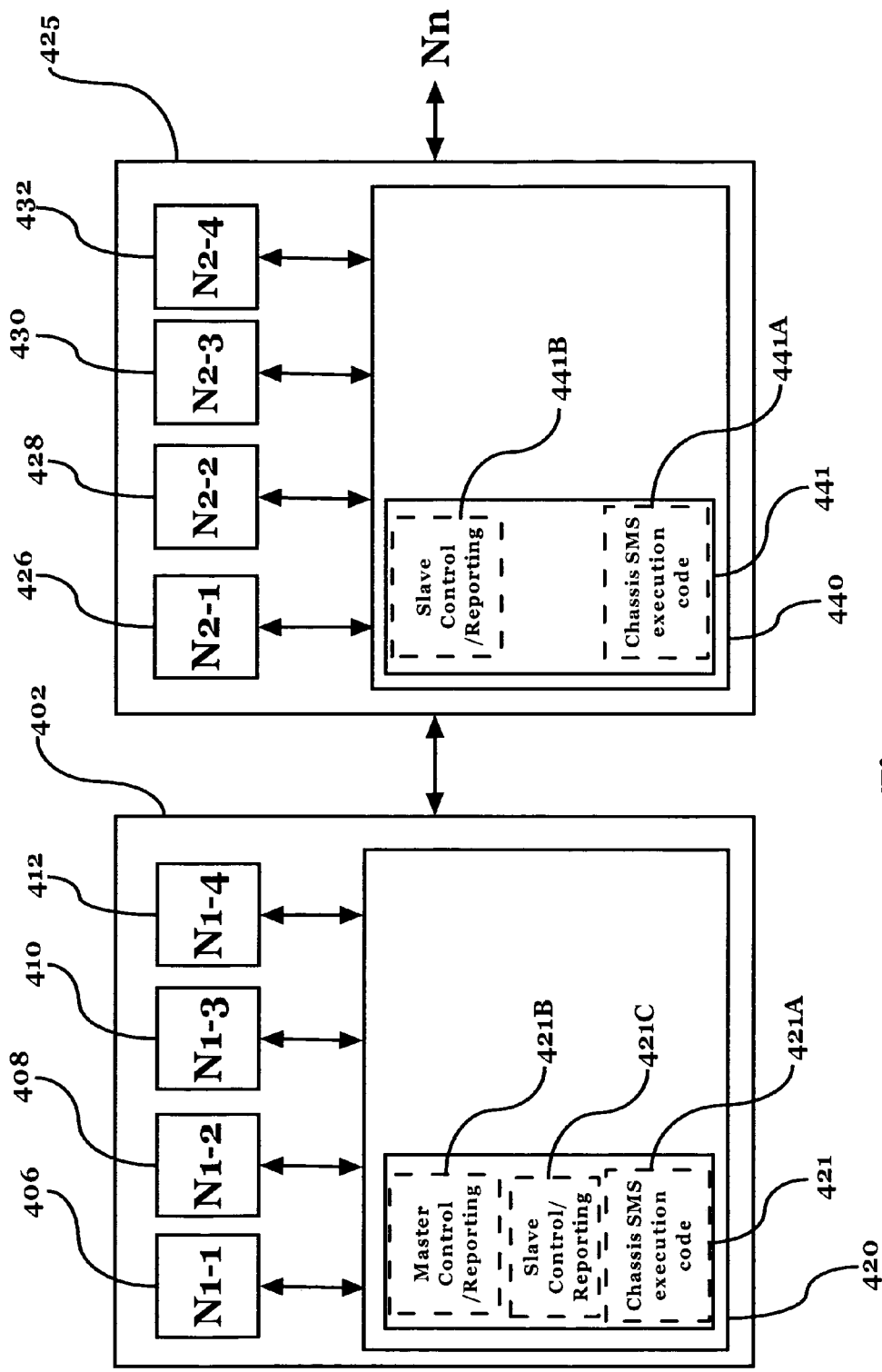
FIG. 4 illustrates a multi-node SMM system in accordance with the present invention.

FIG. 4 illustrates a multi-node SMM system in accordance with the present invention. Referring to FIG. 4, the system memory is partitioned in such a way that a portion of the SMM memory local to each node is allocated for SMM use. The SMM memory segment of each node is assigned to one of the CPUs within that node to support the SMM processing for the resources within that node. If desired, all of the CPUs within each node can be enabled to support SMM processing in parallel, but in the preferred embodiment, only one CPU per node is so enabled.

On node 402, SMM memory segment 421 of memory element 420 is allocated for SMM processing. Within SMM memory segment 421, sub-partition 421a is reserved for storage of the SMM execution code to be utilized by node (chassis) 402. Similarly, with respect to node 425, SMM memory segment 441 of memory 440 is allocated to handle the SMM processing for node 425. Within SMM memory segment 441, sub-partition 441a is set aside for storage of the SMM execution code for node (chassis) 425. Typically, within each node, a single processor is assigned to execute the code within the portion of the memory set aside for SMM processing. For example, with respect to node 402, CPU 406 might be assigned to execute the code in portion 421, and with respect to node 425, CPU 426 might be assigned to execute the code stored in portion 441. It is understood that any of the CPUs could be assigned to execute the SMM-related code.

However, because the nodes, when executing SMM functions, are operating essentially independently of each other, specific SMM memory locations are allocated and used to report status and results from each node. This allows the system to maintain SMM memory coherency and consistency in memory contents, even when multiple independent read/write devices are accessing the same memory segment, and it allows top level reporting of SMM monitoring function results.

The specific SMM memory locations are allocated by the common SMM code, and then each node needs only to determine its specific ID so that it can execute SMM code and report results using a common SMM executable code copy. Memory is allocated from a partition in one of the nodes designated as the "root node" (essentially, it is the primary node), and the CPU within the root node that is assigned the task of handling the SMM processing becomes the "root processor" for all of the nodes. The root processor then monitors the other node SMM status entries for completion. The combined results are then acted upon at the top system level, i.e., by the root processor, and reported to a Service Processor, described below.

As shown in FIG. 4, the SMM memory partition 421 of memory 420 (Node 402) assigned for use with SMM processing includes slave control/reporting area 421c and master control/reporting area 421b. Similarly, SMM memory partition 441 of memory 440 (node 425) includes slave control/reporting area 441b. Node 402 has master control/reporting area 421b due to its assignment as the root node. The master control/reporting area 421b enables the root node to perform its function as the control point for all hardware functional monitoring. Slave control/reporting area 421c serves a similar function, in that the slave control/reporting area 421c receives and processes reports coming from the other nodes. Thus, for example, slave control/reporting area 441b of node 425 will gather reporting information from node 425 and then issue a report to node 402, and the information so reported will be processed by slave control/reporting area 421c. The results of this processing are then passed on to be processed by the master control/reporting area 421b. Thus, each of the nodes in the system reports information regarding the SMM processing for that node back to the root node, where the information is processed and made available to the system administrator.

In FIG. 4, with CPU 406 designated as the root processor, CPU 406 runs the master control/reporting code, as well as the slave reporting code, and it also executes the chassis SMM execution code 421a. This allows CPU 406 to be used as a control point for all hardware functional monitoring. CPU 406 is used to report to the system administrator all hardware and software status, including recognized failures in any system memory of I/O subsystems. Typically, should the SMM mechanism detect an abnormal event, it will be reported to CPU 406 for reporting and logging.

It is desirable to further reduce inter-node traffic by storing access information locally on each node. This can be implemented by creating a resource map of a specific node (i.e., what specific memory space, and which specific I/O registers need to be checked for a particular node, which might vary depending on specific node configuration). For example, in FIG. 4, the size and characteristics of a memory segment 420 can be described locally to node 402, while the size and characteristics of memory segment 440 can be described locally to node 425. Likewise, the I/O contents of the node at 402, such as network and storage adapters (not shown) may be significantly different from the I/O contents of node 425. Using general chip sets, this can be accomplished by storing the information on each specific node during SMM initialization, in memory space 441b for example. Alternatively, the IBM "X3" chip set provides a node controller chip with localized CPU accessibility through a particular unused address space (e.g., the FEB0xxxx address space). Either of these techniques results in reduced need for inter-node traffic.

Figure 5:
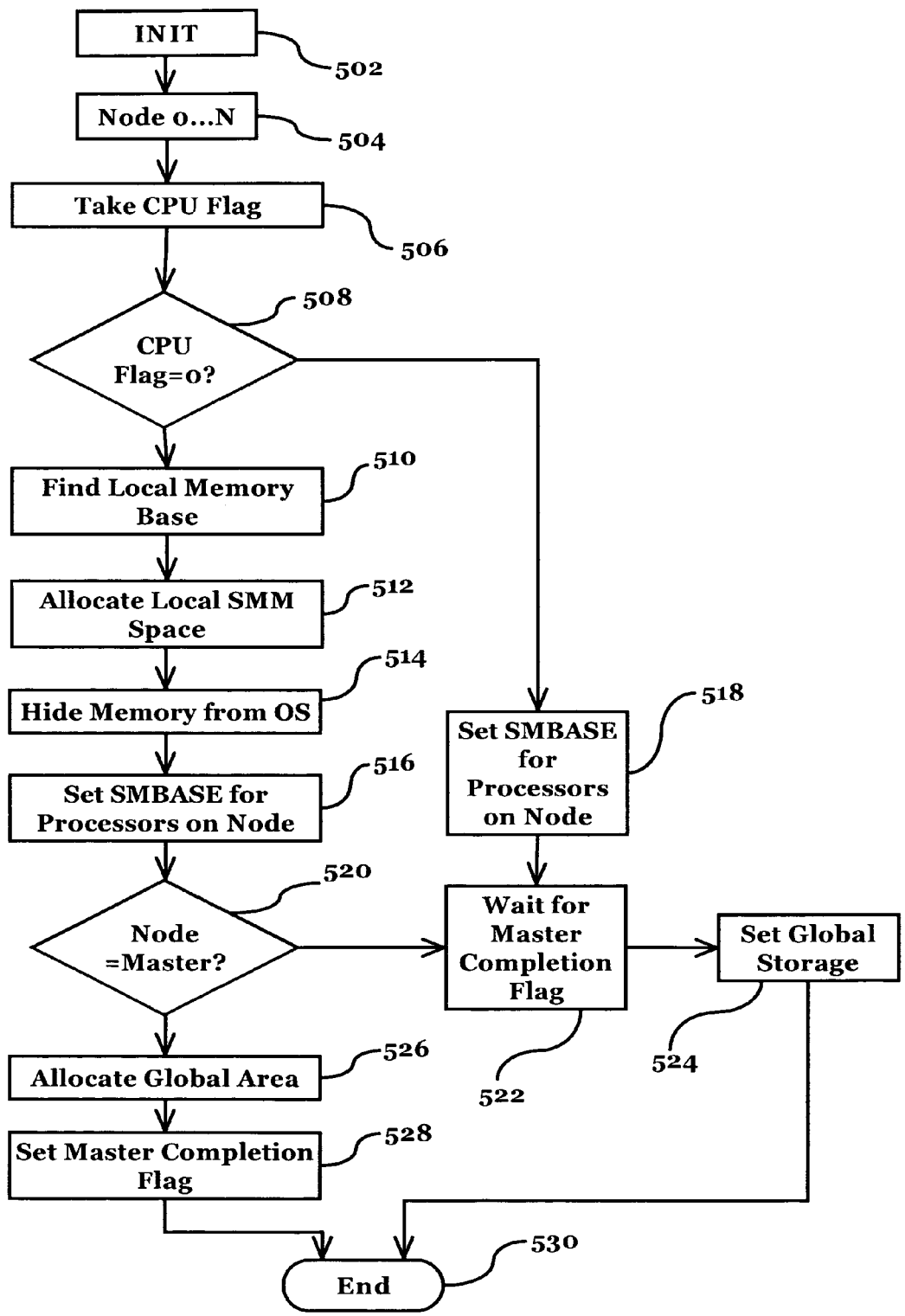
FIG. 5 is a flowchart illustrating the initialization process for a multi-chassis SMP computer system operating in accordance with the present invention.

FIG. 5 is a flowchart illustrating the initialization process for a multi-chassis SMP computer system operating in accordance with the present invention. Referring to FIG. 5, the initialization process begins at step 502, and at step 504 each of the processors obtains the local node's identification number. Node 0 is designated the primary node, and nodes 1 through N are designated as secondary nodes. The node identification numbers are typically established by the system service processor (not shown) at system configuration time.

At step 506, the four local processors each execute a locked read-modify-write identification process so that one and only one of them gains access to the CPU=0 flag. The remaining CPUs obtain a non-zero flag. The resultant CPU flag taken by each of the local node CPUs is tested for a non-zero value in step 508. If the CPU flag equals 0, the process proceeds by executing blocks 510, 512, 514, 516, . . . . The other CPUs branch to the limited initialization path 518.

For the CPU that has its flag set to 0, the process proceeds to step 510 through step 516, where the local memory base is located (the code finds the starting address and length of the memory (420, 440, . . . ) on the particular node), the local SMM space is allocated within the memory of the node, the memory is hidden from the operating system using well understood techniques as identified in the SMM architecture, and then the SMBASE for processors on the node is set. This process completes the configuration of the memory space 421, 441, . . . on the particular node. The SMBASE is the specific register internal to each CPU that allows the SMM operation to be hidden from the operating system, again using well understood techniques as identified in the SMM architecture. Note that step 518 (side path) is the same, so that all CPUs (should the N1-1 fail for example) are also able to execute from 421, . . . 441 . . . the SMM runtime algorithm.

At step 520, a determination is made as to whether or not the node with the CPU flag of 0 is the master node. If it is, the process proceeds to step 526, where the global area is allocated. This is the area 421B (Master Control/Reporting) shown in FIG. 4. At step 528, the master completion flag is set, indicating that the master processor has finished its allocations and initializations, and then at step 530, the process ends.

If, at step 508, the CPU flag being checked is not 0, then the process proceeds to step 518, where the SMBASE for processes on the node is set. Note that step 518 is the same as 516, so that all CPUs (should the N1-1 fail for example) are also able to execute from 421, . . . 441 . . . the SMM runtime algorithm (this provides a more robust design). The process then proceeds to step 522, where the non-primary CPUs (typically N1-2, N1-3, N1-4) wait for the master completion flag. At step 524, the global storage is set (this is the area 421C, 441B, . . . (Slave Control/Reporting) shown in FIG. 4.), and then the process proceeds to step 530, where the process ends. In a preferred embodiment, all CPUs in the system will enter into the routine of FIG. 5 at roughly the same time, and then they all run in parallel, and exit independently.

Figure 6:
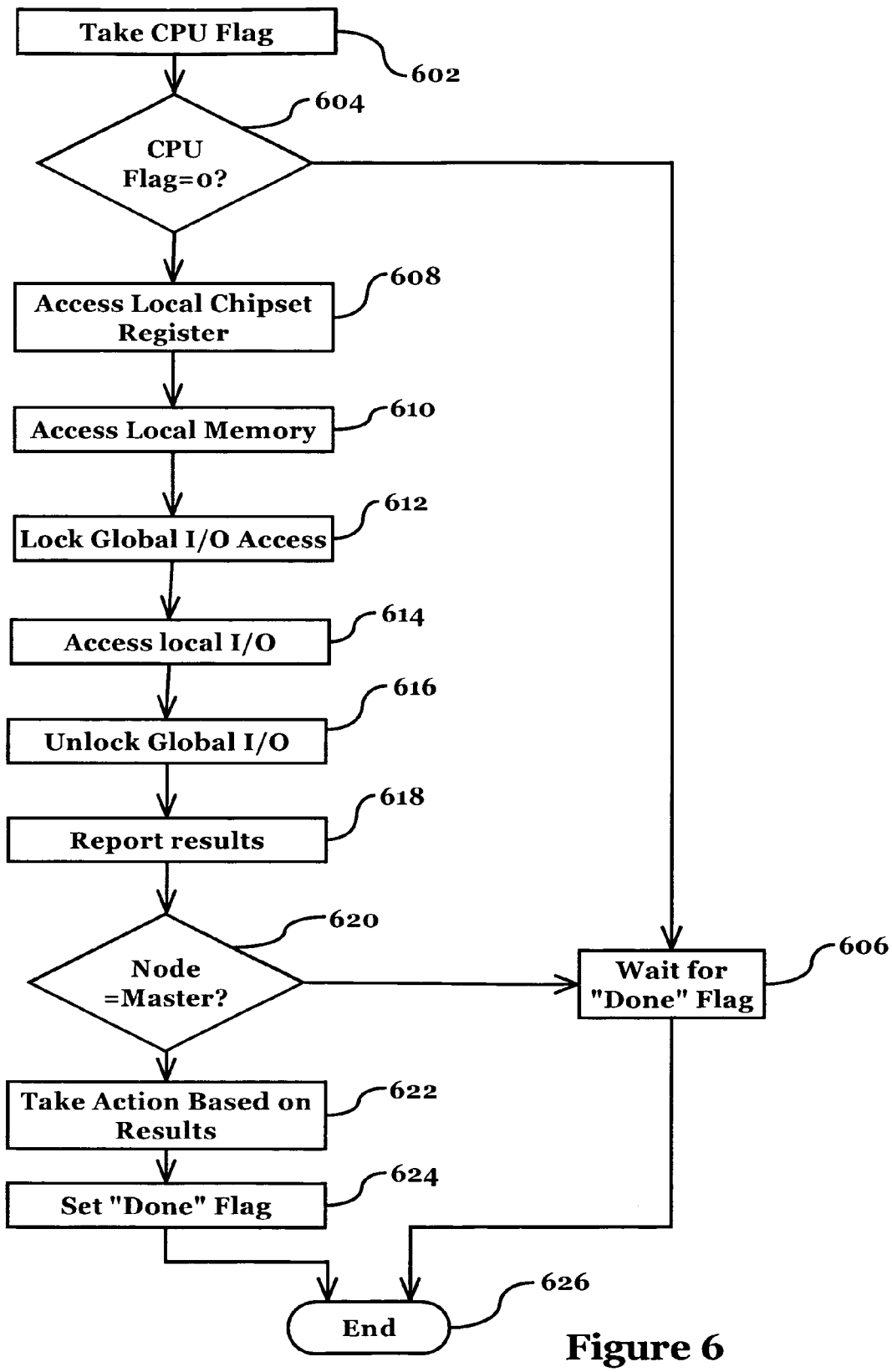
FIG. 6 is a flowchart illustrating steps performed during the runtime routine.

FIG. 6 is a flowchart illustrating steps performed during the runtime routine. This process runs every time that a SMI occurs. SMI is a System Management Interrupt, which is defined in the well known SMM architecture. This is a particular type of system interrupt that is specifically intended to cause all CPUs to begin execution of the "Chassis SMM Execution code" at 421A, 441A, and this process runs on every CPU in each node. Referring to FIG. 6, at step 602, the next CPU flag is examined. If, at step 604, it is determined that the CPU flag does not equal 0, then the process proceeds directly to step 606, and the process waits for the occurrence of the "done flag". If, at step 604, a determination is made that the CPU flag does equal 0, this indicates that this CPU is the first on the node, and that it will be used as the primary SMM processor (i.e., it is typically N1-1 or N2-1.

The process then proceeds to steps 608-618, where the SMM execution code scans the local chip set registers, looking for any failure indications or service requests that have been generated by that node controller; the local memory is accessed, again looking for any failure indications; then the global I/O access is locked (which prevents other node CPUs from accessing any local I/O devices; such accesses could cause a fault). To prevent any spurious off-node I/O accesses, the local I/O devices are accessed and scanned for any error indications; the global I/O is unlocked (returning to normal state); and then the results of the scan for errors are reported by writing results data into the Slave Reporting area (421C).

The process then proceeds to step 620, and it is determined whether or not the node that had the CPU flag set to 0 is the master node. This step ensures that only the CPU 0 on Node 0 (i.e., the "multi-node Master CPU") processes the following steps. If it is not CPU 0 on Node 0, this means it will remain idle until the master CPU is complete and then the process proceeds to step 606 to wait for the "done flag".

If, at step 620, it is determined that the node is the master node, then the process proceeds to step 622, where action is taken based upon the results of the error scanning for the complete system, including all of the additional nodes. A typical action might be to disable a specific I/O device, such as a network adapter on node N2, that has failed. Alternately, a particular memory segment may be flagged as bad if the previous scan detected a failure. Finally, the "done flag" is then set at step 624, and then the process proceeds to step 626 where it ends.

The present invention allows for improved System Management Mode functionality in advanced multi-node computer systems. The problem of extended SMM processing delays in large multi-node systems is solved in an innovative way. The operation shown extends multiple concepts of system management onto multi-node operation, such that characteristics of these nodal systems are taken advantage of by the innovative design.

More specifically, a method for enhanced SMM performance in multi-node systems is presented, nearly limiting the overall performance delays (SMM execution time) to be equivalent to that of a single node design. These delays are not impacted by the potentially large additional resources, such as added memory and additional I/O devices that multi-node designs typically feature.

In addition, parallel processing of an asymmetric nature is employed, even though the overall system design remains fully symmetrical. The method of the present invention illustrates how each node independently (asymmetrically) processes localized management tasks. Further, by partitioning local memory space within each node, and assigning CPUs also on that node to SMM operation, system resources can be maximally employed for SMM processing. This partitioning also allows inter-node traffic to be minimized.

Inter-node traffic is further minimized by initializing and using on each node a resource map containing all relevant SMM target (managed) resources (memory and I/O devices). CPUs are assigned on a nodal basis for processing within that node, while establishing and using only a small memory area for full system reporting of per-node results back to the root node and associated service processor.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a computer system in which the SMP architecture of the present invention is utilized. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of managing a multi-node SMP system, with each node in said multi-node SMP system including two or more processors, comprising:
    designating one of said nodes as a root node;
    designating at least one of said processors within each node as an SMM processor for its node;
    performing SMM processing on each node; and
    reporting results of said SMM processing performed on each node to said root node.

2. The method of claim 1, wherein only one of said processors within each node is designated as an SMM processor for its node, further comprising:
    designating the processor of said root node designated as the SMM processor for said root node as a root processor for said multi-node SMP system.

3. The method of claim 2, further comprising:
    assigning a memory partition of memory from within each node as an SMM memory partition; and
    populating each SMM memory partition of each node with common SMM code for performing said SMM processing.

4. The method of claim 3, further comprising:
    populating the SMM memory partition of each node with slave control/reporting code; and
    executing said slave control/reporting code in each SMM memory partition of each node to gather SMM reporting information from its respective node and forward said gathered SMM reporting information to said root node.

5. The method of claim 4, further comprising:
    populating the SMM memory partition of said root node with master control/reporting code;
    receiving, by said root node, all of said reporting information gathered from each node; and executing said master control/reporting code to process said gathered information and make said processed gathered information to an administrator of said multi-node SMM system.

6. The method of claim 5, further comprising:
based on said processed gathered information, instituting action to be taken with respect to the multi-node SMP system.

7. A system of managing a multi-node SMP system, with each node in said multi-node SMP system including two or more processors, comprising:
means for designating one of said nodes as a root node;
means for designating at least one of said processors within each node as an SMM processor for its node;
means for performing SMM processing on each node; and
means for reporting results of said SMM processing performed on each node to said root node.

8. The system of claim 7, wherein only one of said processors within each node is designated as an SMM processor for its node, further comprising:
means for designating the processor of said root node designated as the SMM processor for said root node as a root processor for said multi-node SMP system.

9. The system of claim 8, further comprising:
means for assigning a memory partition of memory from within each node as an SMM memory partition; and
means for populating each SMM memory partition of each node with common SMM code for performing said SMM processing.

10. The system of claim 9, further comprising:
means for populating the SMM memory partition of each node with slave control/reporting code; and
means for executing said slave control/reporting code in each SMM memory partition of each node to gather SMM reporting information from its respective node and forward said gathered SMM reporting information to said root node.

11. The system of claim 10, further comprising:
means for populating the SMM memory partition of said root node with master control/reporting code;
means for receiving, by said root node, all of said reporting information gathered from each node; and
means for executing said master control/reporting code to process said gathered information and make said processed gathered information to an administrator of said multi-node SMM system.

12. The system of claim 11, further comprising:
means for instituting action to be taken with respect to the multi-node SMP system, based on said processed gathered information.

13. A computer program product for managing a multi-node SMP system, with each node in said multi-node SMP system including two or more processors, the computer program product comprising a computer-readable storage medium having computer-readable program code embodied in the medium, the computer-readable program code comprising:
computer-readable program code that designates one of said nodes as a root node;
computer-readable program code that designates at least one of said processors within each node as an SMM processor for its node;
computer-readable program code that performs SMM processing on each node; and
computer-readable program code that reports results of said SMM processing performed on each node to said root node.

14. The computer program product of claim 13, wherein only one of said processors within each node is designated as an SMM processor for its node, further comprising:
computer-readable program code that designates the processor of said root node designated as the SMM processor for said root node as a root processor for said multi-node SMP system.

15. The computer program product of claim 14, further comprising:
computer-readable program code that assigns a memory partition of memory of each node as an SMM memory partition; and
computer-readable program code that populates each SMM memory partition of each node with common SMM code for performing said SMM processing.

16. The computer program product of claim 15, further comprising:
computer-readable program code that populates the SMM memory partition of each node with slave control/reporting code; and
computer-readable program code that executes said slave control/reporting code in each SMM memory partition of each node to gather SMM reporting information from its respective node and forward said gathered SMM reporting information to said root node.

17. The computer program product of claim 16, further comprising:
computer-readable program code that populates the SMM memory partition of said root node with master control/reporting code;
computer-readable program code that receives, by said root node, all of said reporting information gathered from each node; and
computer-readable program code that executes said master control/reporting code to process said gathered information and make said processed gathered information to an administrator of said multi-node SMM system.

18. The computer program product of claim 17, further comprising:
computer-readable program code that institutes action to be taken with respect to the multi-node SMP system, based on said processed gathered information.

* * * * *